United States Patent
Gao et al.

(10) Patent No.: US 6,395,431 B1
(45) Date of Patent: May 28, 2002

(54) ELECTROLYTES HAVING IMPROVED STABILITY COMPRISING AN N,N-DIALKYLAMIDE ADDITIVE

(75) Inventors: Feng Gao; Jeremy Barker; Hang Shi; Tracy Kelley; Chariclea Scordilis-Kelley, all of Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 0 days.

(21) Appl. No.: 09/182,392

(22) Filed: Oct. 28, 1998

(51) Int. Cl.[7] .................................................. H01M 6/16
(52) U.S. Cl. ....................................... 429/326; 429/339
(58) Field of Search ................................ 429/306, 307, 429/324, 326, 339, 49

(56) References Cited

U.S. PATENT DOCUMENTS

| | | | |
|---|---|---|---|
| 4,166,888 A | * | 9/1979 | Rao et al. |
| 4,279,972 A | | 7/1981 | Moses et al. ................. 429/50 |
| 4,526,846 A | | 7/1985 | Kearney et al. ............ 429/194 |
| 5,085,954 A | | 2/1992 | Kita et al. ................... 429/194 |
| 5,395,711 A | * | 3/1995 | Tahara et al. |
| 5,418,091 A | | 5/1995 | Gozdz et al. ................ 429/252 |
| 5,419,985 A | | 5/1995 | Koksbang et al. .......... 429/212 |
| 5,456,000 A | | 10/1995 | Gozdz et al. ................ 29/623.2 |
| 5,460,904 A | | 10/1995 | Gozdz et al. ................ 429/192 |
| 5,474,858 A | | 12/1995 | Merritt et al. ................. 429/57 |
| 5,514,496 A | * | 5/1996 | Mishima et al. |
| 5,540,741 A | | 7/1996 | Gozdz et al. ............... 29/623.5 |
| 5,643,695 A | * | 7/1997 | Barker et al. |
| 5,900,336 A | * | 5/1999 | Kabata et al. |
| 5,952,126 A | * | 9/1999 | Lee et al. |

OTHER PUBLICATIONS

The Merck Index, 11th edition, Merck & Co., Inc. New Jersey (1989) p. 3218, No month available,*

* cited by examiner

*Primary Examiner*—Gabrielle Brouillette
*Assistant Examiner*—Susy Tsang
(74) *Attorney, Agent, or Firm*—Harness, Dickey & Pierce, P.L.C.

(57) ABSTRACT

The invention provides an electrochemical cell having an electrolyte which comprises a solute, a solvent, and an additive. The additive is a dialkylamide. The dialkylamide lessens the extent of decomposition of the solute, which is a lithium salt. The ionic species of the lithium salt are thereby preserved. The additive also prevents damage to active material by absorbing excess charge energy below the breakdown potential of the active material.

5 Claims, 5 Drawing Sheets

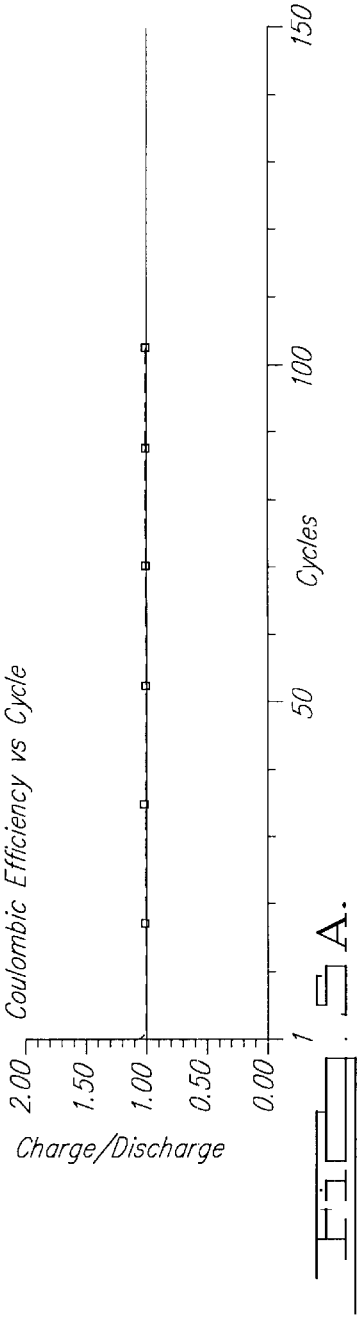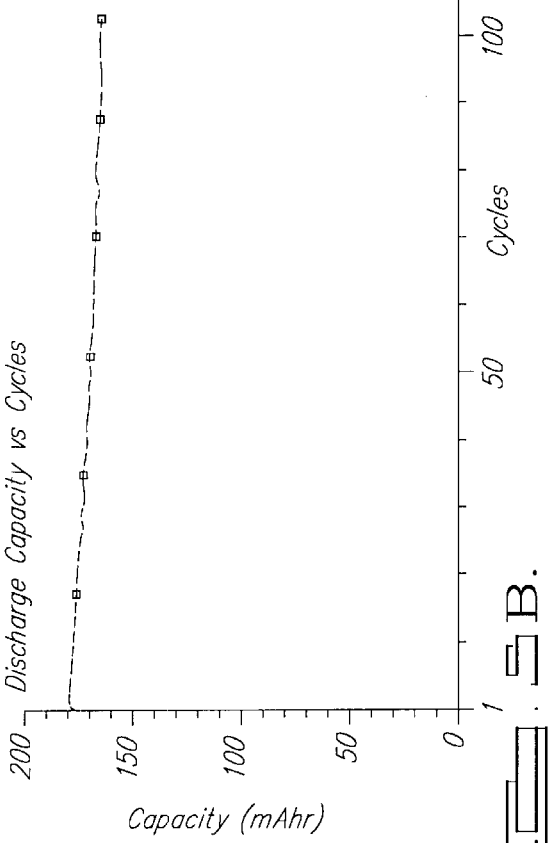
FIG. 3A.
FIG. 3B.

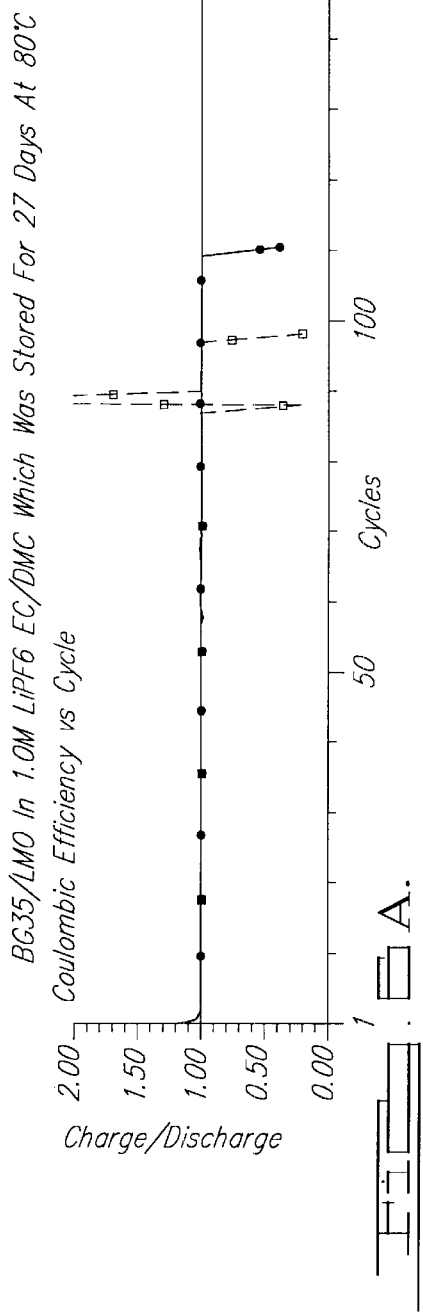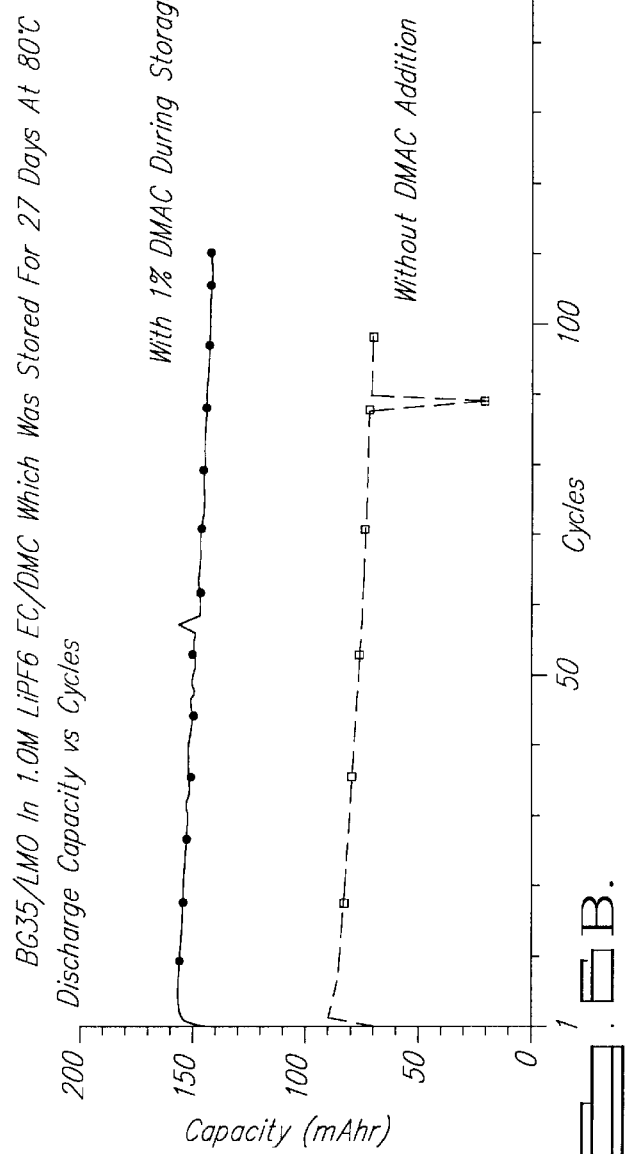
FIG. A.
FIG. B.

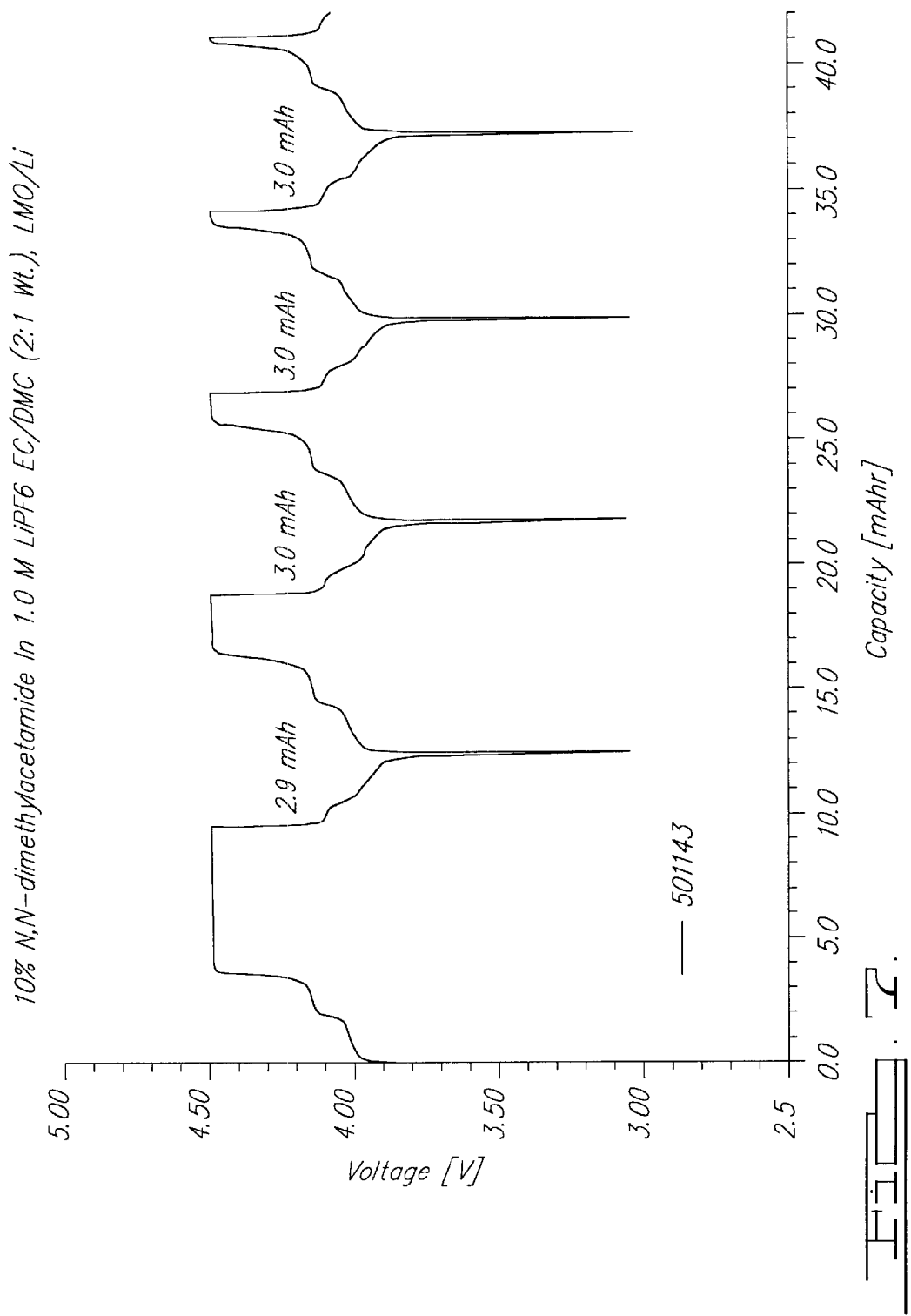

ELECTROLYTES HAVING IMPROVED STABILITY COMPRISING AN N,N-DIALKYLAMIDE ADDITIVE

FIELD OF THE INVENTION

This invention relates to electrolytes which function as a source of alkali metal ions for providing ionic mobility and conductivity. The invention more particularly relates to electrolytic cells where such electrolytes function as an ionically conductive path between electrodes.

BACKGROUND OF THE INVENTION

Electrolytes are an essential member of an electrolytic cell or battery. In one arrangement, a battery or cell comprises an intermediate separator element containing an electrolyte solution through which lithium ions from a source electrode material move between cell electrodes during the charge/discharge cycles of the cell. The invention is particularly useful for making such cells in which the ion source electrode is a lithium compound or other material capable of intercalating lithium ions, and where an electrode separator membrane comprises a polymeric matrix made ionically conductive by the incorporation of an organic solution of a dissociable lithium salt which provides ionic mobility.

Early Lithium Metal Cells

Early rechargeable lithium cells utilized lithium metal electrodes as the ion source in conjunction with positive electrodes comprising compounds capable of intercalating the lithium ions within their structure during discharge of the cell. Such cells relied, for the most part, on separator structures or membranes which physically contained a measure of fluid electrolyte, usually in the form of a solution of a lithium compound, and which also provided a means for preventing destructive contact between the electrodes of the cell. Sheets or membranes ranging from glass fiber, filter paper or cloth to microporous polyolefin film or nonwoven organic or inorganic fabric have been saturated with solutions of an inorganic lithium compound, such as $LiClO_4$, $LiPF_6$, or $LiBF_4$, in an organic solvent to form such electrolyte/separator elements. The fluid electrolyte bridge thus established between the electrodes has effectively provided the necessary Li+ ion mobility at conductivities in the range of about $10^{-3}$ S/cm.

Ion, Rocking Chair Cells and Polymer Cells

Lithium metal anodes cause dendrite formation during charging cycles which eventually leads to internal cell short-circuiting. Some success has been achieved in combatting this problem through the use of lithium-ion cells in which both electrodes comprise intercalation materials, such as lithiated metal oxide and carbon (U.S. Pat. No. 5,196,279), thereby eliminating the lithium metal which promotes the deleterious dendrite growth. Another approach to controlling the dendrite problem has been the use of continuous films or bodies of polymeric materials which provide little or no continuous free path of low viscosity fluid in which the lithium dendrite may propagate. These materials may comprise polymers, e.g., poly(alkene oxide), which are enhanced in ionic conductivity by the incorporation of a salt, typically a lithium salt such as $LiClO_4$, $LiPF_6$, or the like. A range of practical ionic conductivity, i.e., over about $10^{-5}$ to $10^{-3}$ S/cm, was only attainable with these polymer compositions at well above room temperature, however. (U.S. Pat. Nos. 5,009,970 and 5,041,346.)

"Solid" and "Liquid" Batteries of the Prior Art

More specifically, electrolytic cells containing an anode, a cathode, and a solid, solvent-containing electrolyte incorporating an inorganic ion salt were referred to as "solid batteries". (U.S. Pat. No. 5,411,820). These cells offer a number of advantages over electrolytic cells containing a liquid electrolyte (i.e., "liquid batteries") including improved safety factors. Despite their advantages, the manufacture of these solid batteries requires careful process control to minimize the formation of impurities. Solid batteries employ a solid electrolyte matrix interposed between a cathode and an anode. The inorganic matrix may be non-polymeric [e.g., β-alumina, silver oxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283.

Examples of solvents known in the art are propylene carbonate, ethylene carbonate, γ-butyrolactone, tetrahydrofuran, glyme (dimethoxyethane), diglyme, tetraglyme, dimethylsulfoxide, dioxolane, sulfolane, diethoxyethane, and the like. These are examples of aprotic, polar solvents.

Heretofore, the solid, solvent-containing electrolyte has typically been formed by one of two methods. In one method, the solid matrix is first formed and then a requisite amount of this material is dissolved in a volatile solvent. Requisite amounts of the inorganic ion salt and the electrolyte solvent (usually a glyme and the organic carbonate) are then added to the solution. This solution is then placed on the surface of a suitable substrate (e.g., the surface of a cathode) and the volatile solvent is removed to provide for the solid electrolyte. In another method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte. When the solid electrolyte is formed on a cathodic surface, an anodic material can then be laminated onto the solid electrolyte to form a solid battery (i.e., an electrolytic cell).

More recently, a highly favored electrolyte/separator film is prepared from a copolymer of vinylidene fluoride and hexafluoropropylene. Methods for making such films for cell electrodes and electrolyte/separator layers are described in U.S. Pat. Nos. 5,418,091; 5,460,904; and 5,456,000 assigned to Bell Communications Research, each of which is incorporated herein by reference in its entirety. A flexible polymeric film useful as an interelectrode separator or electrolyte member in electrolytic devices, such as rechargeable batteries, comprises a copolymer of vinylidene fluoride with 2 to 25% hexafluoropropylene. The film may be cast or formed as a self-supporting layer retaining about 20% to 70% of a high-boiling solvent or solvent mixture comprising such solvents as ethylene carbonate or propylene carbonate. The film may be used in such form or after leaching of the retained solvent with a film-inert low-boiling solvent to provide a separator member into which a solution of electrolytic salt is subsequently imbibed to displace retained solvent or replace solvent previously leached from the polymeric matrix.

Electrolyte Breakdown

Regardless of which technique is used in preparing an electrolyte/separator, a recurring problem has been the loss of effectiveness of the electrolyte. The electrolyte has been observed to change color, evidencing a degradation that has not been well understood. There is presently no effective means to maintain the useful serviceability of the electrolyte.

In view of the above, it can be seen that it is desirable to have a novel, economical means for maintaining electrolyte integrity; and which maintains cell capacity in a variety of electrolyte/separator configurations, including those described above as exemplary.

SUMMARY OF THE INVENTION

The present invention provides an additive for an electrolyte solution of an electrochemical cell. The additive provides an electrolyte solution stabilized against decomposition during storage and during cyclic operation of an electrochemical cell. The additive is a dialkylamide, desirably a N,N-dialkylamide, and preferably is N,N-dimethylacetamide (DMAC). Advantageously, the additive prevents undesired decomposition of cell components, and particularly electrolyte solution components. Such undesired decomposition is evidenced by a change in color of the electrolyte solution, and may also result in undesired gaseous by-products. Gaseous by-products lead to volumetric expansion and possible rupture of the cell. The additive is usable with a variety of carbonaceous and metal oxide electrode active materials, providing improved performance without decomposition, which would otherwise occur, absent the additive.

In addition, the DMAC additive breaks down at potentials at or near an overcharge condition, nominally at or over about 4.4 volts. Thus, in a condition at or near cell overcharge condition, the DMAC additive aborbs excess charge energy by degrading at or just about 4.4 volts. This protects the active material from electrochemical damage by preventing the attainment of the damage threshold voltage, about 4.7 volts or higher, for lithium metal oxide active materials such as lithium manganese oxide, lithium cobalt oxide and lithium nickel oxide.

In one embodiment, the invention provides an electrochemical cell having an electrolyte which comprises a solute, a solvent, and the additive of the invention. The solute is a salt of lithium. The solvent comprises one or more aprotic, polar solvents. The dialkylamide of the invention is usable with a variety of solvents and salts. Exemplary solvents are carbonates; lactones; propionates; five member heterocyclic ring compounds; and organic solvent compounds having a low alkyl (1–4 carbon) group connected through an oxygen to a carbon, and comprising C—O—C bonds. Exemplary solvents are selected from the group consisting of propylene carbonate (PC), ethylene carbonate (EC), methyl ethyl carbonate (MEC), also referred to as ethyl methyl carbonate (EMC) diethyl carbonate (DEC), dipropyl carbonate (DPC), dimethyl carbonate (DMC), butylene carbonate (BC), dibutyl carbonate (DBC), and vinylene carbonate (VC). Among the preferred solvents are EC/DMC, EC/DEC, EC/DPC, and EC/EMC. With these combinations, there may also be used ethyl propionate (EP). Particularly preferred is EC/DMC/DMAC and EC/DMC/DMAC/EP. Any amount of DMAC added to the electrolyte solvent is helpful. Practical amounts are in the range of up to 20% by weight of the solvent mixture. The DMAC additive, from a practical point of view, may be present in the solvent mixture in an amount of 0.1% to 20% by weight of the solvent mixture. A range of 1% to 5% is preferred.

The DMAC enhances the thermal stability of lithium salts, such as LiPF$_6$, and also enhances stability of co-solvents. Lithium salts are known to be subject to decomposition, and DMAC is useful to prevent such decomposition. As a result, the ionic species of the salt are preserved for ion transport. The additive of the present invention inhibits, prevents, or at least reduces and minimizes undesired side reaction which causes decomposition of cell components, and also prevents, inhibits, or reduces evolution of gaseous by-products which occur as a result of such decomposition. Advantageously, the additive of the present invention exhibits good performance and is compatible with a wide range of salts, solvents, and electrode active materials. Good performance is achieved even with carbonaceous electrode active material and with transition metal electrode active material which show poor performance when used in comparative conventional cells without the additive.

Objects, features, and advantages of the invention include an improved electrochemical cell or battery having improved charging and discharging characteristics; a large discharge capacity; and which maintains its integrity over a prolonged life cycle, as compared to presently used batteries and cells. Another object is to provide an electrolyte mixture which is stable with respect to electrode active materials, and which demonstrates high performance, and which does not readily decompose, evaporate, or solidify. It is also an objective of the present invention to provide cells with electrolyte solutions compatible with other cell components, avoiding problems with undesired reactivity, decomposition, and gas formation.

These and other objects, features, and advantages will become apparent from the following description of the preferred embodiments, claims, and accompanying drawings.

BRIEF DESCRIPTION OF THE DRAWINGS

FIG. 5 is a two-part graph showing the results of testing a cell, rocking chair battery, having an anode comprising BG-35 active material cycled with a counter-electrode comprising lithium manganese oxide active material. FIG. 5A is Coulombic Efficiency and 5B is Discharge Capacity, each Versus Cycles. The cell charge and discharge are at ±1 milliamp hour per centimeter square, between 3 and 4.2 volts for 1 to 107 cycles. The negative electrode contained 570 milligrams of the BG-35 active material and the positive electrode contained 1710 milligrams of the lithium manganese oxide active material. The surface area of the positive electrode was 48 square centimeters and the surface area of the negative electrode was 48 square centimeters. The electrolyte comprised 1% DMAC in 1 molar $LiPF_6$ EC/DMC. The weight ratio of EC/DMC was 2:1. The overall weight ratio of EC/DMC/DMAC was 66:33:1.

FIG. 6 is a two-part graph showing the results of testing a comparative cell, without any DMAC additive. (Dashed data line). The cell had an anode comprising BG-35 active material cycled with a counter-electrode comprising lithium manganese oxide active material. The cell charge and discharge are at ±1 milliamp hour per centimeter square, between 3 and 4.2 volts for 1 to 100 cycles. The negative electrode contained 508 milligrams of the BG-35 active material and the positive electrode contained 1524 milligrams of the lithium manganese oxide active material. The surface area of the positive electrode was 48 square centimeters and the surface area of the negative electrode was 48 square centimeters. The electrolyte was 1 molar $LiPF_6$ in EC/DMC. The weight ratio of EC/DMC is 2:1. In FIGS. 6A and 6B, the data for the comparative cell are shown by dashed (--) lines. The data for the cell of Example III is repeated as a solid line for direct comparison. FIG. 6A is Coulombic Efficiency and 6B is Discharge Capacity, each Versus Cycles.

FIG. 7 is voltage/capacity plot taken under the same conditions as FIG. 4, except that the cell was overcharged, using constant current cycling to a level of about 4.43 volts. The flat voltage profile at 4.43 volts shows the breakdown of DMAC, and the subsequent recovery of cell operation due to DMAC protection.

DETAILED DESCRIPTION OF THE PREFERRED EMBODIMENTS

Figure 1:
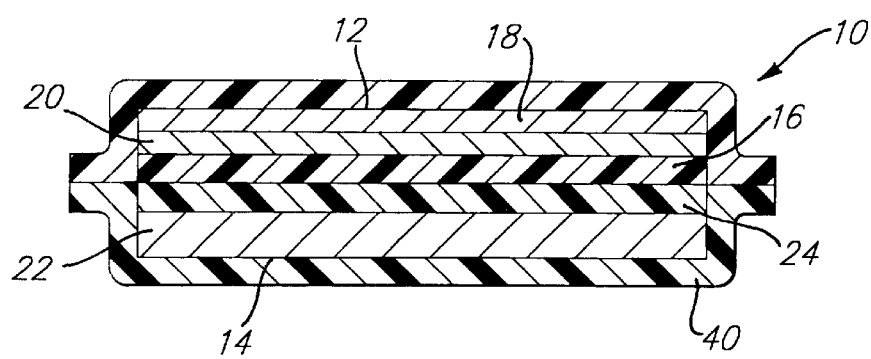
FIG. 1 is a diagrammatic representation of a typical laminated lithium-ion battery cell structure which is prepared with the electrolyte salt of the present invention.

The invention provides an understanding of the mechanisms by which electrolyte salt decomposes, and provides an effective method for preventing or at least inhibiting such decomposition. Therefore, the invention provides electrolyte stability, and particularly, thermal stability.

The exothermic reaction involving a lithiated carbon anode active material and the electrolyte in a cell, has not to this point been adequately addressed. Thermal decomposition of the electrolyte salt is thought to involve, for example, $LiPF_6$ decomposing to $LiF+PF_5$. The $PF_5$ formed is a strong oxidizing agent as well as a Lewis acid. The oxidizing nature of the $PF_5$ is thought to impart significant reactivity with lithiated carbon which itself is a very strong reducing agent. By the present invention, this difficulty is resolved by the addition of a specifically selected and specifically suitable Lewis base to significantly reduce the reactivity by neutralizing the formed $PF_5$. The aforesaid difficulty was observed in lithium ion cells having aprotic, polar solvents such as ethylene carbonate and dimethyl carbonate, in combination with a lithium ion salt, for example $LiPF_6$. Such electrolyte formulation, being representative of a class of solvents and salts, have demonstrated themselves to be not stable, particularly at elevated temperatures such as 60 degrees centigrade. This poses a significant disadvantage in both the processing to form the cell and the operation of the cell.

In another aspect, there is the partial decomposition of the inorganic ion salt formed in the polymer matrix. Partial decomposition occurs due to exposure of the inorganic ion salts to the high temperatures used, for example, in forming the polymer matrix, and/or in evaporating the volatile solvent, and/or in batteries used at elevated temperatures. These high temperatures cause the salt to break down into insoluble or less soluble salts. For example, upon decomposition of lithium hexafluorophosphate ($LiPF_6$), the decomposition product LiF is also formed; and the LiF is much less soluble in the electrolyte solvent and can precipitate out. Such insoluble or less soluble salts cannot function to transfer electrons, and hence the resulting battery is rendered less efficient.

Thus, in preparing electrolyte/separator, great care must be taken to maintain processing temperatures below the threshold level for significant salt decomposition. The need for careful monitoring of process temperatures increases manufacturing costs and at the same time results in a percentage of the electrolyte/separators produced being off specification due to unavoidable process temperature variation. Electrolyte/separator materials meeting production specifications generally contain small but tolerable levels of impurities which can nevertheless affect cell performance, particularly with respect to cumulative capacity. Cumulative capacity of a battery is defined as the summation of the capacity of the battery over each cycle (charge and discharge) in a specified cycle life.

It has been determined that the above difficulties are overcome by the addition of an additive Lewis base. More specifically, the additive is a dialkylamide. It is preferred that the dialkylamide is N,N-dimethylacetamide (DMAC). The dialkylamide is effective in electrolyte solutions comprising a solute consisting essentially of a salt of lithium, and a solvent consisting essentially of one or more aproctic, polar solvent compounds in combination with the additive. Desirably, the polar solvent compounds are each characterized by having a carbon connected through an oxygen to another carbon.

Preferably, the aprotic polar solvent is selected from the group consisting of carbonates, lactones, propionates, five member ring compounds, and organic solvent compounds having a low alkyl group (1–4 carbons) connected through an oxygen to a carbon and comprising C—O—C bonds.

It is preferred that the aprotic, polar solvent to which the dialkylamide is added is a carbonate selected from the group consisting of propylene carbonate (PC), ethylene carbonate (EC), methyl ethyl carbonate (MEC), diethyl carbonate (DEC), dipropyl carbonate (DPC), dimethyl carbonate (DMC), butylene carbonate (BC), dibutyl carbonate (DBC), vinylene carbonate (VC), ethyl methyl carbonate (EMC), and mixtures thereof. (Table II).

The aforesaid additive was found to be effective in stabilizing the electrolyte in cells, even at elevated temperatures. Cells which contained the additive were found to be stable during storage and at 0 to about 4.4 volts (vs. $Li/Li^+$). Such cells included half cells formed with graphitic active material; half cells formed with lithium metal oxide active material; and full cells of lithium metal oxide/graphite. Baseline cells having 48 centimeters squared electrodes were tested with the additive at elevated temperature (80°) and at ambient (room temperature).

Advantageously, it has been found that the DMAC additive of the invention promotes electrolyte stability during normal operation of a cell, up to about 4.4 volts. In addition, the DMAC additive breaks down at potentials at or near an overcharge condition, nominally at or over about 4.4 volts. Thus, in a condition at or near cell overcharge condition, the DMAC additive absorbs excess charge energy by degrading at or just above about 4.4 volts. This protects the active material from electrochemical damage by preventing the attainment of the damaged threshold voltage for lithium metal oxide active materials such as lithium manganese oxide, lithium cobalt oxide, and lithium nickel oxide. For example, the damage threshold for lithium manganese oxide is on the order of 4.7 volts and that of similar lithium metal oxides is in this range and up to about 5 volts. Therefore the DMAC additive provides two very important advantages. It maintains stability of the electrolyte and enhances stability of other cell components in the range of the normal operating voltage of the cell. In addition, the DMAC prevents decomposition and degradation of cell components on an overcharge condition, since DMAC consumes excess energy generated in such overcharge condition to prevent degradation of other cell components and to protect other cell components and particularly cathode active material.

Results of the testing will be described more particularly below. It should be noted that the organic acid derivative, N,N-dialkylamide was successfully used to stabilize $LiPF_6$ at elevated temperature. The initial data provided below shows that at 80° C. the electrolyte did not change any color in several weeks when the amide additive was included.

A battery or cell which utilizes the novel family of salts of the invention will now be described. Note that the preferred cell arrangement described here is illustrative and the invention is not limited thereby. Experiments based on full and half cell arrangements were conducted as per the following description.

Polymeric electrolytic cells comprise polymeric film composition electrodes and separator membranes. In particular, rechargeable lithium battery cells comprise an intermediate separator element containing an electrolyte solution through which lithium ions from a source electrode material move between cell electrodes during the charge/discharge cycles of the cell. In such cells an ion source electrode is a lithium compound or other material capable of intercalating lithium ions. An electrode separator membrane comprises a polymeric matrix made ionically conductive by the incorporation of an organic solution of a dissociable lithium salt which provides ionic mobility. Strong, flexible polymeric electrolytic cell separator membrane materials retain electrolyte lithium salt solutions and remain functional over temperatures ranging well below room temperature. These electrolyte membranes are used either in the usual manner as separator elements with mechanically assembled battery cell components, or in composite battery cells constructed of successively coated layers of electrode and electrolyte compositions.

A typical laminated battery cell structure 10 is depicted in FIG. 1. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture.

Figure 2:
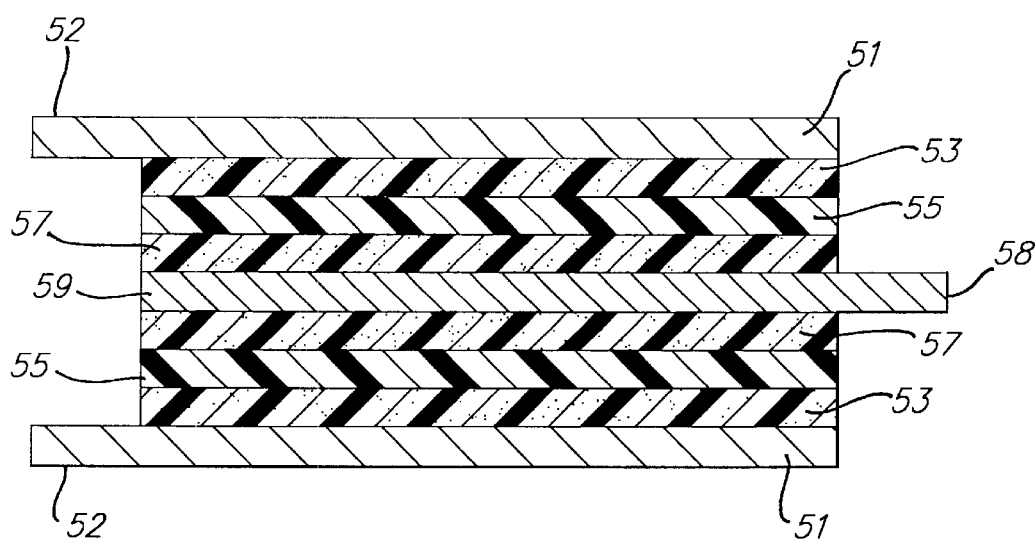
FIG. 2 is a diagrammatic representation of a multicell battery cell structure which is prepared with the electrolyte salt of the present invention.

In another embodiment, a multicell battery configuration as per FIG. 2 is prepared with copper current collector 51, negative electrode 53, electrolyte/separator 55, positive electrode 57, and aluminum current collector 59. Tabs 52 and 58 of the current collector elements form respective terminals for the battery structure.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–85 weight percent. The negative electrode comprises about 50–95% by weight of a preferred graphite, with the balance constituted by the binder. A typical electrolyte separator film comprises approximately two parts polymer for every one part of a preferred fumed silica. Before It should be noted removal of the plasticizer, the separator film comprises about 20–70% by weight of the composition; the balance constituted by the polymer and fumed silica in the aforesaid relative weight proportion. The conductive solvent comprises any number of suitable solvents and salts. Desirable solvents and salts are described in U.S. Pat. Nos. 5,643,695 and 5,418,091. One example is a mixture of $EC:PC:LiPF_6$ in a weight ratio of about 50:44.3:5.7.

Advantageously, the additive of the invention is usable with a variety of solvents. In addition, the range of salt content may be relatively broad. Solvents are selected from such mixtures as dimethyl carbonate (DMC), diethylcarbonate (DEC), dipropylcarbonate (DPC), ethylmethylcarbanate (EMC), ethylene carbonate (EC), propylene carbonate (PC), butylene carbonate, lactones, esters, glymes, sulfoxides, sulfolanes, etc. The preferred solvents are EC/DMC, EC/DEC, EC/DPC and EC/EMC. With these combinations, there may also be used ethyl propionate (EP). Particularly preferred is EC/DMC/DMAC and EC/DMC/DMAC/EP. The salt content ranges from 5% to 65% by weight, preferably from 8% to 35% by weight. Physical characteristics of the DMAC are given in Table I. Physical characteristics of exemplary aprotic, polar solvents are given in Table II. Any amount of DMAC added to the solvent is helpful. Practical amounts are up to 20% by weight of the solvent mixture, desirably up to 10%. A 0.1 to 20 weight percent is practical, 0.1 to 10% desirable, and 1% to 5% is preferred.

It should be noted that the preferred EC/DMC/DMAC provides a number of advantages. EC is a high dielectric solvent and enhances dissociation of the salt. DMC has low viscosity and promotes mobility of ions. DMAC enhances the thermal stability of $LiPF_6$ and seems to stabilize co-solvents. The same advantages apply to other lithium-fluorine salts such as $LiBF_4$ and $LiAsF_6$.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

In the construction of a lithium-ion battery, a current collector layer of aluminum foil or grid is overlaid with a positive. electrode film, or membrane, separately prepared as a coated layer of a dispersion of intercalation electrode composition. This is typically an intercalation compound such as $LiMn_2O_4$ (LMO), $LiCoO_2$, or $LiNiO_2$, powder in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, intercalation electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of 5,411,820 is an example. More modern examples are the VDF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell which utilizes the novel solvent of the invention may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells were fabricated using lithium metal electrodes. When forming cells for use as batteries, it is preferred to use an intercalation metal oxide positive electrode and a graphitic carbon negative electrode. Various methods for fabricating electrochemical cells and batteries and for forming electrode components are described herein. The invention is not, however, limited by any particular fabrication method as the novelty lies in the unique electrolyte.

EXAMPLE I

A graphite electrode was fabricated by solvent casting a slurry of BG-35 graphite, binder, plasticizer, and casting solvent. The graphite, BG-35, was supplied by Superior Graphite, Chicago, Ill. The BG series is a high purity graphite derived from a flaked natural graphite purified by heat treatment process. The physical features are given in Table III. The binder was a copolymer of polyvinylidene difluoride (PVDF) and hexafluoropropylene (HFP) in a wt. ratio of PVDF to HFP of 88:12. This binder is sold under the designation of Kynar Flex 2801®, showing it's a registered trademark. Kynar Flex is available from Atochem Corporation. An electronic grade solvent was used. The slurry was cast onto glass and a free standing electrode was formed as the casting solvent evaporated. The slurry composition was as follows:

| Component | Wet Weight % | Dry Weight % |
|---|---|---|
| Graphite | 25.0 | 60.0 |
| Binder | 6.8 | 16.4 |
| Plasticizer | 8.9 | 21.4 |
| Carbon | 0.9 | 2.2 |
| Solvent | 58.4 | — |
| Total | 100.0 | 100.0 |

The counter-electrode was lithium metal. A glass fiber separator was used between the electrodes to prevent them from electrically shorting. An electrochemical cell of the first electrode, separator, and counter-electrode was formed.

Figure 3:
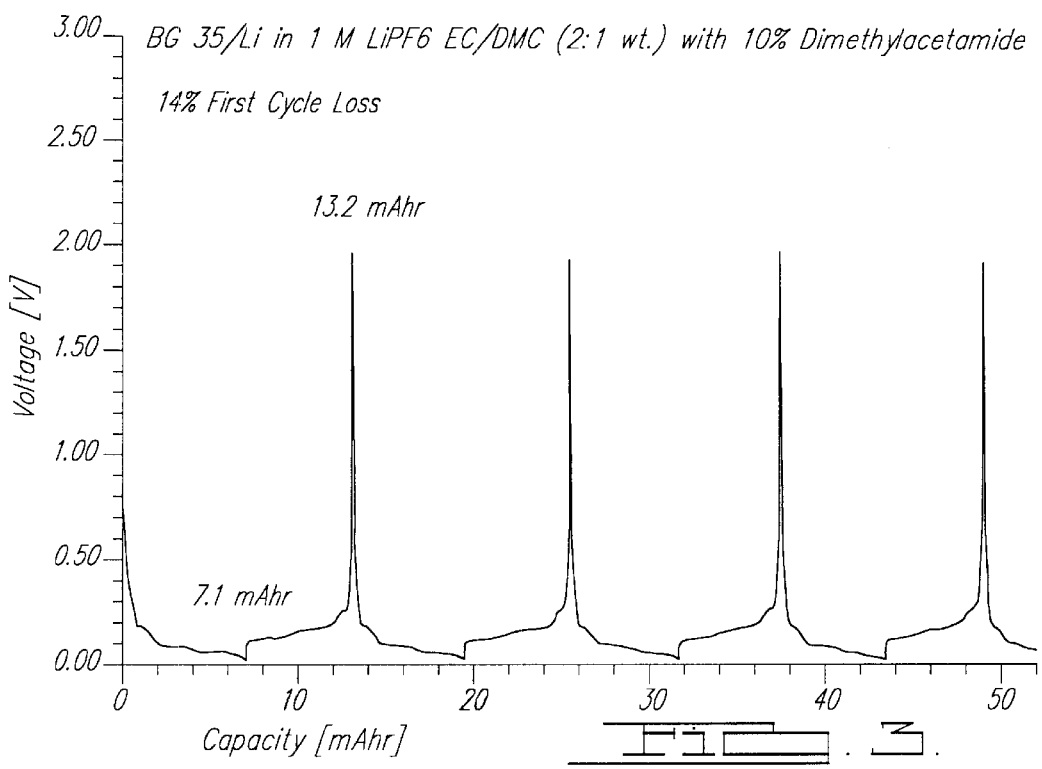
FIG. 3 is a voltage/capacity plot, showing cumulative capacity (mAh), for a BG-35 graphite carbon electrode cycled with a lithium metal counter-electrode using constant current cycling at ±0.2 milliamps per square centimeter, between 0.01 and 2.0 volts, using 19 milligrams of the BG-35 active material. The electrolyte was 1 molar LiPF$_6$ in a solution of ethylene carbonate (EC) and dimethyl carbonate (DMC), 2:1 wt. EC:DMC; and including 10% by weight dimethylacetamide (DMAC).

The electrolyte used to form the completed final cell or battery comprised a solution of ethylene carbonate (EC), dimethyl carbonate (DMC), and N,N-dimethylacetamide (DMAC). Two different amounts of the additive were tested. One was 1% DMAC and 99% of the EC/DMC. The other was 10% DMAC and 90% of the EC/DMC. In both cases the EC/DMC weight ratio was 2:1. The electrolyte solution contained 1 molar $LiPF_6$ salt. The two electrodes were maintained in separated condition using a glass fiber layer. The electrolyte solution interpenetrated the void spaces of the glass fiber layer. The results of constant current cycling are shown in FIG. 3. FIG. 3 shows a voltage/capacity plot of BG-35 graphite cycled with a lithium metal electrode using constant current cycling at ±0.2 milliamps per square centimeter, between 0.01 and 2.0 volts versus $Li/Li^+$, using 19 milligrams of the BG-35 active material. The electrolyte is 1 molar $LiPF_6$ in a solution of 90% by weight of 2:1 EC/DMC and 10% by weight DMAC. In the first half cycle, lithium is removed from the metallic electrode and intercalated into the graphite electrode. When essentially full intercalation at the graphite electrode is complete, corresponding to about $Li_1C_6$, the voltage has dropped to approximately 0.01 volts, representing about 370 milliamp hours per gram, corresponding to about 7.1 milliamp hours based on 19 milligrams of active material. In the second half cycle, the lithium is deintercalated from the graphite and returned to the metallic electrode until the average voltage is approximately 2 volts versus Li/Li$^+$. The deintercalation corresponds to approximately 318 milliamp hours per gram, representing approximately 6.1 milliamp hours based on 19 milligrams of active material. This completes an initial cycle. The percentage difference between the 370 milliamp hours per gram capacity "in", and the 318 milliamp hours per gram capacity "out", divided by the initial capacity "in", corresponds to a surprisingly low 14 percent loss. In the rest of FIG. 1, the cycling is repeated, maintaining high capacity.

EXAMPLE II

An electrode cathode was also fabricated by solvent casting a slurry of lithium manganese oxide, conductive carbon, binder, plasticizer, and solvent. The lithium manganese oxide used was LiMn$_2$O$_4$ supplied by Kerr-McGee (Soda Springs, Id.); the conductive carbon used was Super P (MMM carbon), Kynar Flex 2801® was used as the binder along with a plasticizer, and electronic grade acetone was used as the solvent. The slurry was cast onto aluminum foil coated with polyacrylic acid/conductive carbon mixture. The slurry was cast onto glass and a free standing electrode was formed as the solvent was evaporated. The cathode slurry composition was as follows:

| Component | Wet Weight % | Dry Weight % |
| --- | --- | --- |
| LiMn$_2$O$_4$ | 28.9 | 65.0 |
| Graphite | 2.5 | 5.5 |
| Binder | 4.5 | 10.0 |
| Plasticizer | 8.7 | 19.5 |
| Solvent | 55.4 | — |
| Total | 100.0 | 100.0 |

The cell was prepared as noted above. The electrochemical cell was prepared as noted above with respect to Example I. The electrolyte was prepared having the same composition as the electrolyte of Example I.

Figure 4:
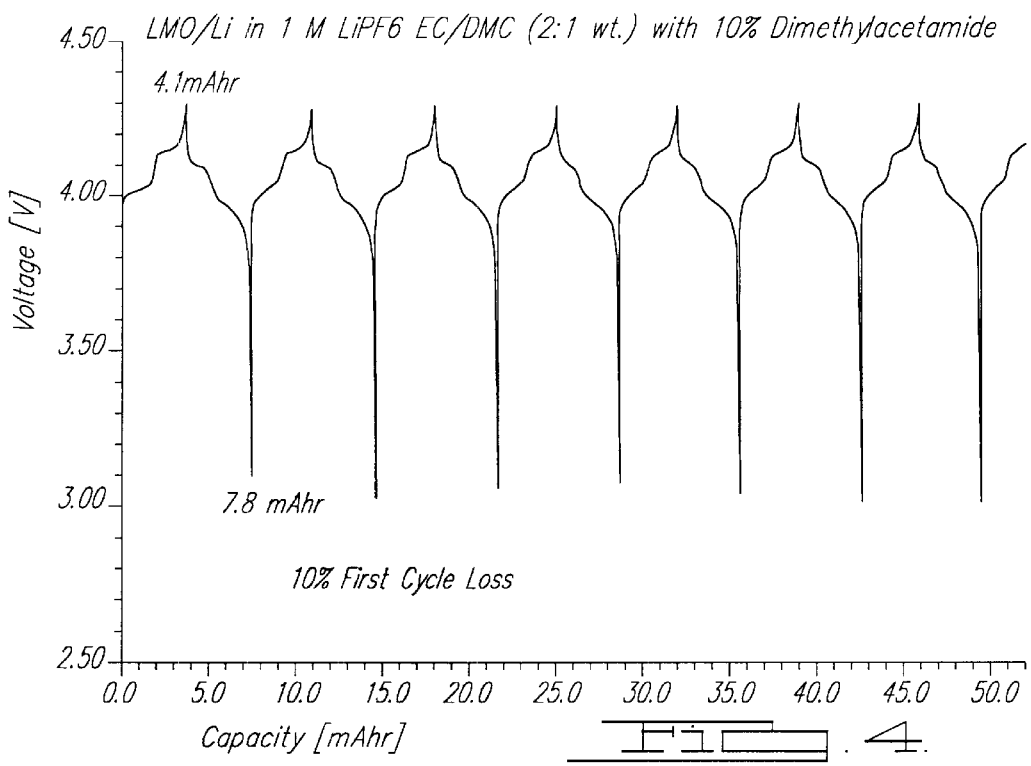
FIG. 4 is a voltage/capacity plot showing cumulative capacity (mAh) for lithium manganese oxide (LMO) electrode cycled with a lithium metal counter-electrode using constant current cycling at ±0.2 milliamps per square centimeter, between 3.0 and 4.3 volts, using 30 milligrams of the LMO active material. The electrolyte was 1 molar LiPF$_6$ in a solution of 2:1 by weight of EC:DMC; and including 10% by weight dimethylacetamide (DMAC).

FIG. 4 contains the results of constant current cycling and is a graph of cell voltage versus capacity. FIG. 4 shows a voltage/capacity plot of lithium manganese oxide (nominally LiMn$_2$O$_4$, Li$_{1+x}$Mn$_2$O$_4$, $-0.2 \leq x \leq 0.2$; usually x is 0.6 normal starting stoichiometry for LMO) cycled with a lithium metal electrode using constant current cycling at ±0.2 milliamps per square centimeter, between about 3 and 4.3 volts versus Li/Li$^+$, using 30 milligrams of the LMO active material. The electrolyte is 1 molar LiPF$_6$ in a solution of 90% by weight of 2:1 EC/DMC and 10% by weight DMAC.

In an as-assembled, initial condition, the positive electrode active material is nominal LiMn$_2$O$_4$. The lithium is deintercalated from LMO during charging of the cell. When fully charged, optimally about 0.8 unit of lithium has been removed per formula unit of the original LiMn$_2$O$_4$. In this fully charged condition, the electrochemical potential versus lithium of the LMO, is about 4.3 volts. The deintercalation of lithium from LMO results in approximately 135 milliamp hours per gram corresponding to 4.1 milliamp hours. Next, the cell is discharged whereupon a quantity of lithium is reintercalated into the LMO. The reintercalation corresponds to approximately 122 milliamp hours per gram or 3.7 milliamp hours, and the bottom of the curve corresponds to approximately 3 volts. The cell is then subsequently recharged whereupon a quantity of lithium ions is again deintercalated, returning to the region of approximately 4 volts. Charging and discharging continued successfully over a number of additional cycles. As can be seen from FIG. 4, the first cycle loss corresponded to only 10 percent, which is very good.

EXAMPLE III

In this example, a rocking chair battery was prepared comprising a graphite anode, an intercalation compound cathode, and a novel electrolyte comprising the DMAC additive of the invention. The negative electrode comprising BG-35 was prepared as described in Example I. The lithium manganese oxide positive electrode was prepared in accordance with the description given in Example II. The active mass of the negative electrode was 570 milligrams and the active mass of the positive electrode was 1710 milligrams. A first solvent solution of 1 molar LiPF$_6$ in EC/DMC (2:1 by weight) was prepared. Then, 99 percent by weight of this first solvent solution was mixed with 1 percent by weight of DMAC, to form a solvent mixture for the test cell. (EC/DMC/DMAC at 66:33:1 weight ratio.) The two electrode layers were arranged with an electrolyte layer in between, and the layers were laminated together using heat and pressure as per the Bell Comm. Res. patents incorporated herein by reference earlier.

FIG. 5 is a two-part graph. FIG. 5A shows the excellent rechargeability and FIG. 5B shows the excellent cyclability and capacity of the cell prepared in accordance with Example III. The capacity was determined at constant current cycling for cycles 1 to 107 consistent with the test parameters described above. FIG. 5 shows long cycle life demonstrated by the relatively slow capacity fade with cycle numbers. The recharge ratio data shows the absence of any appreciable side reactions and decompositions over the extended life cycling. This can be more particularly seen from FIG. 5A. The recharge ratio maintains its value exceptionally close to 1. The cell maintains over 92 percent of its capacity over extended cycling to 100 cycles. The combination of slow, minimal capacity fade along with excellent recharge ratio demonstrates the absence of any appreciable side reactions. The cell of FIG. 5 contained 1 M LiPF$_6$ EC/DMC (2:1 wt.) with 1% DMAC addition. It cycled well with low capacity fade. It indicated a good compatibility of the DMAC in the system which stabilized the electrolyte. As per Examples I and II, the use of DMAC as an additive stabilizes the solvent mixture against breakdown.

Comparative Example

For comparison purposes, an additional cell was prepared in accordance with the methods of Examples I, II and III, except that the solvent did not contain any DMAC. The solvent was 1 molar LiPF$_6$ in 2:1 EC/DMC. This electrolyte was also used in a cell having a lithium metal oxide positive electrode and a BG-35 negative counter-electrode. The active mass of the positive electrode was 1524 milligrams and the negative electrode was 508 milligrams. This comparative cell without DMAC additive was also stored at 80° C. for 27 days.

FIG. 6 contains the results of cycling the comparative cell (without DMAC) and repeats the performance of the cell of Example III (1% DMAC) for direct comparison. The dashed lines of FIGS. 6A and 6B show the poor performance of the comparative cell. The cells of FIG. 6 were activated using electrolytes (with or without DMAC addition) that had been stored for 27 days at 80° C. The cell (solid line) with DMAC addition during storage showed 16% first cycle loss (table IV) and maintained 92% of initial capacity at 100 cycles. The cell without DMAC (dashed --), however, gave 39% first cycle loss with 80% initial capacity at 100 cycles. This is evidence that electrolyte breakdown is not occurring. Further evidence of lack of electrolyte breakdown is the fact that the cell does not expand in volume and puff up. This shows absence of gas formation caused by electrolyte breakdown. Absence of such gassing, absence of electrolyte breakdown, and absence of irreversible charge consumption demonstrates the unique and unexpected advantage of the electrolyte solvent of the invention.

Further data showing the beneficial effects of adding DMAC to electolyte solution are given in Tables IV and V. Table IV clearly shows that with DMAC, the stored electrolyte shows little solution color change. In contrast, the same electrolyte solution without DMAC shows significant color change demonstrating electrolyte degradation.

Table V shows results of DSC reactivity of anode films for fully intercalated carbon electrode (i.e., the anode potential (20 mV vs. Li/Li$^+$). The thermal reactivity of the anode toward the electrolyte is significantly improved with inclusion of DMAC in the electrolyte solution. The 55–86 (–J/g) exotherm for the BG-35/EC-DMC-DMAC combination is a fraction of the 550 (–J/g) for the EC/DMC combination.

EXAMPLE IV

A constant current cycling test was conducted and an overcharge condition was induced to demonstrate the ability of the DMAC to protect cell components during a non-design, overcharge event. The conditions of testing are the same as that described above for FIG. 4, except that the cell was overcharged, using constant current cycling to a level of about 4.43 volts. The cell contained lithium manganese oxide electrode cycled with a lithium metal counter-electrode using constant current cycling. The electrolyte was 1 molar LiPF$_6$ in a solution of ethylene carbonate (EC) and dimethyl carbonate (DMC), 2:1 wt of EC:DMC; and, 10% by weight dimethylacetamide (DMAC) was added to the aforesaid solution.

FIG. 7 shows the results of the overcharge test. FIG. 7 clearly demonstrates the protection of lithium manganese oxide by DMAC addition to the electrolyte. The flat voltage profile at 4.43 volts shows the breakdown of DMAC and the cathode capacity upon discharge or charge remains unchanged during subsequent cycles as shown in FIG. 7.

More specifically, FIG. 7 shows that once the voltage is brought up to about 4.3 to 4.4 volts or greater, a flat plateau occurs. This flat plateau indicates the breakdown of the DMAC. Subsequently, on discharge, 2.9 milliamp hours results showing recovery of the cell. This overcharge condition was induced a second time whereupon, additional DMAC absorbed the energy of excess charge and broke down again protecting cell components. Thereupon, a discharge value of 3.0 milliamp hours was obtained. This demonstrated that even though the cell was cycled to an overcharge condition causing breakdown of some of the DMAC, the cell was able to recover and cycle to subsequent overcharge and discharge conditions. This will continue is to occur as long as DMAC is available to absorb the excess charge potential. Therefore, these short occurrences of overcharge caused breakdown of DMAC, instead of breaking down precious cell components such as cathode active material. Therefore, although active material such as lithium manganese oxide can be electrochemically damaged if the potential is above 5 volts, the addition of DMAC into the electrolyte protects the active material from being overcharged since the DMAC is first broken down at a lower potential (4.43 volts) absorbing the excess energy before the cell reaches the potential of the active material breakdown.

TABLE I

| N,N-dimethylacetamide (DMAC) | |
|---|---|
| Physical: | Colorless liquid |
| Specific Gravity: | 0.9366 at 25° C. |
| Melting Point: | –57° C. |
| Boiling Point at 760 mm: | 163–165° C. |

TABLE II

Characteristics of Organic Solvents

| | PC | VC | EC | DMC | DEC | BC | MEC | DPC |
|---|---|---|---|---|---|---|---|---|
| Boiling Temperature (C.) | 240 | 162 | 248 | 91.0 | 126 | 230 | 107 | 167–168 |
| Melting Temperature (C.) | –49 | 22 | 39–40 | 4.6 | –43 | — | –55 | — |
| Density (g/cm$^3$) | 1.198 | 1.35 | 1.322 | 1.071 | 0.98 | 1.139 | 1.007 | 0.944 |
| Solution Conductivity (S/cm) | 2.1 × 10$^{-9}$ | — | <10$^{-7}$ | <10$^{-7}$ | <10$^{-7}$ | <10$^{-7}$ | 6 × 10$^{-9}$ | <10$^{-7}$ |
| Viscosity (cp) at 25° C. | 2.5 | — | 1.86 (at 40° C.) | 0.59 | 0.75 | 2.52 | 0.65 | — |
| Dielectric Constant at 20° C. | 64.4 | — | 89.6 (at 40° C.) | 3.12 | 2.82 | — | — | — |
| Molecular Weight | 102.0 | 86.047 | 88.1 | 90.08 | 118.13 | 116.12 | 104.10 | 146.19 |
| H$_2$O Content | <10 ppm | — | <10 ppm | <10 ppm | <10 ppm | <10 ppm | <10 ppm | <10 ppm |
| Electrolytic Conductivity (mS/cm) 20° C. 1 M LiAsF$_6$ | 5.28 | — | 6.97 | 11.00 (1.9 mol) | 5.00 (1.5 mol) | <3.7 | — | — |

TABLE III

| Carbon Material | BG-35 |
|---|---|
| Surface Area (m$^2$/g) (BET) | 7 |
| Coherence Length L$_c$ (nm) | >1000 |
| Density (g/cm$^3$)[2] | 0.195 |
| Particle Size[1] | <36 |
| Median Size d$_{50}$ (µm) | 17 |
| Interlayer Distance c/2 (nm) | N/A |

[1]Maximum size for at least 90% by weight of graphite particles.
[2]In xylene.

TABLE IV

Storage Test Results of Electrolyte Solution With and Without DMAC Addition

| Electrolyte solution | Appearance after 10 days at 80° C. | Appearance after 27 days at 80° C. | First cycle loss BG35/LMO cells with the 27 day stored electrolyte % |
|---|---|---|---|
| 1.0 M LiPF$_6$ EC/DMC (2:1 wt.) with 1% DMAC | clear, colorless | light brown | 16 |
| 1.0 M LiPF$_6$ EC/DMC (2:1 wt.) | light brown | dark brown | 39 |

TABLE V

Effects of DMAC to the Anode Reactivity Toward Electrolyte

| Electrolyte solution | Anode formulation | Exothermic temperature (° C.) | Exotherm (-J/g) |
|---|---|---|---|
| 1.0 M LiPF$_6$ EC/DMC (2:1 wt.) with 1% DMAC | 60% BG 35 | 145–146 | 55–86 |
| 1.0 M LiPF$_6$ EC/DMC (2:1 wt.) | 60% BG 35 | 132–148 | >500 |

In summary, the invention solves the problems associated with conventional electrolytes. Solvents containing DMC have always been a problem since DMC readily boils off. EC readily solidifies, and it is necessary for the cell to achieve a temperature of 40° C. to melt the EC and prevent it from solidifying. In addition, mixtures of DMC/EC have been found to result in decomposition evidenced by solution color change and/or by formation of gas. In contrast, solvents of the invention which include DMAC additive provide highly desirable wide temperature operating range while avoiding decomposition of cell components. While not wishing to be held to any particular theory, it is thought that the solvent of the invention avoids problems associated with conventional solvents containing C—O—C bonds. The solvent of the present invention appears to stabilize the lithium metal salt and/or the C—O—C bond. It is also possible that the DMAC neutralizes HF formed from reaction of LiPF$_6$ with water. It is believed that HF catalyzes decomposition of LiPF$_6$ salt at elevated temperature. The nitrogen of DMAC acts as a proton acceptor, therefore DMAC is a Lewis base. The DMAC additive thus lessens the extent of decomposition of the lithium salt. Therefore, the ionic species of the salt are preserved. In the exemplary LiPF$_6$, the lithium ion Li$^+$ and corresponding anion (counter ion) PF$_{-6}$ are each maintained. Formation of the exemplary decomposition product, LiF, is prevented or at least reduced. Therefore, the solvents of the invention are an improvement over conventional solvents. It is thought that the solvents of the invention also help overcome problems associated with reactive active materials and avoids the consequences of catalytic reaction which catalyzes decomposition of electrolyte solvent.

The DMAC additive provides two very important advantages. It maintains stability of the electrolyte cell components in the range of the normal operating voltage of the cell. In addition, the DMAC prevents decomposition and degradation of cell components on an overcharge condition, since DMAC consumes excess energy generated in such overcharge condition to prevent degradation of other cell components and to protect other cell components and particularly cathode active material. Therefore, it is thought that the stable electrolyte solvent of the invention provides a significant advantage since it avoids decomposition caused by a variety of mechanisms.

While this invention has been described in terms of certain embodiments thereof, it is not intended that it be limited to the above description, but rather only to the extent set forth in the following claims.

The embodiments of the invention in which an exclusive property or privilege is claimed are defined in the following claims

What is claimed is:

1. An electrochemical cell having a non-metallic anode and an electrolyte which comprises a solute, a solvent, and an additive; said solute consisting essentially of a salt of lithium; said solvent consisting essentially of one or more aprotic, polar solvents, and said additive being a dialkylamide, wherein said one or more aprotic solvent compounds has a carbon connected through an oxygen to another carbon, and said additive is up to 10% by weight of an N,N-dialkylamide, based on the total weight of the solvent.

2. A cell according to claim 1, wherein said solvent comprises ethylene carbonate (EC) and dimethyl carbonate (DMC), and said additive is N,N-dimethylacetamide (DMAC).

3. A cell according to claim 1, wherein said solvent comprises ethylene carbonate (EC), dimethyl carbonate (DMC), and ethyl propionate (EP), and said additive is N,N-dimethylacetamide (DMAC).

4. An electrochemical cell having a non-metallic anode and an electrolyte which comprises a solute, a solvent, and an additive; said solute consisting essentially of a salt of lithium; said solvent consisting essentially of one or more aprotic, polar solvents, and said additive being N,N-dimethylacetamide (DMAC), wherein DMAC is present in an amount by weight of up to 10% of said solvent.

5. A cell according to claim 4 wherein said DMAC is present in an amount by weight of 0.1% to 5% of said solvent.

* * * * *